Patented May 21, 1929.

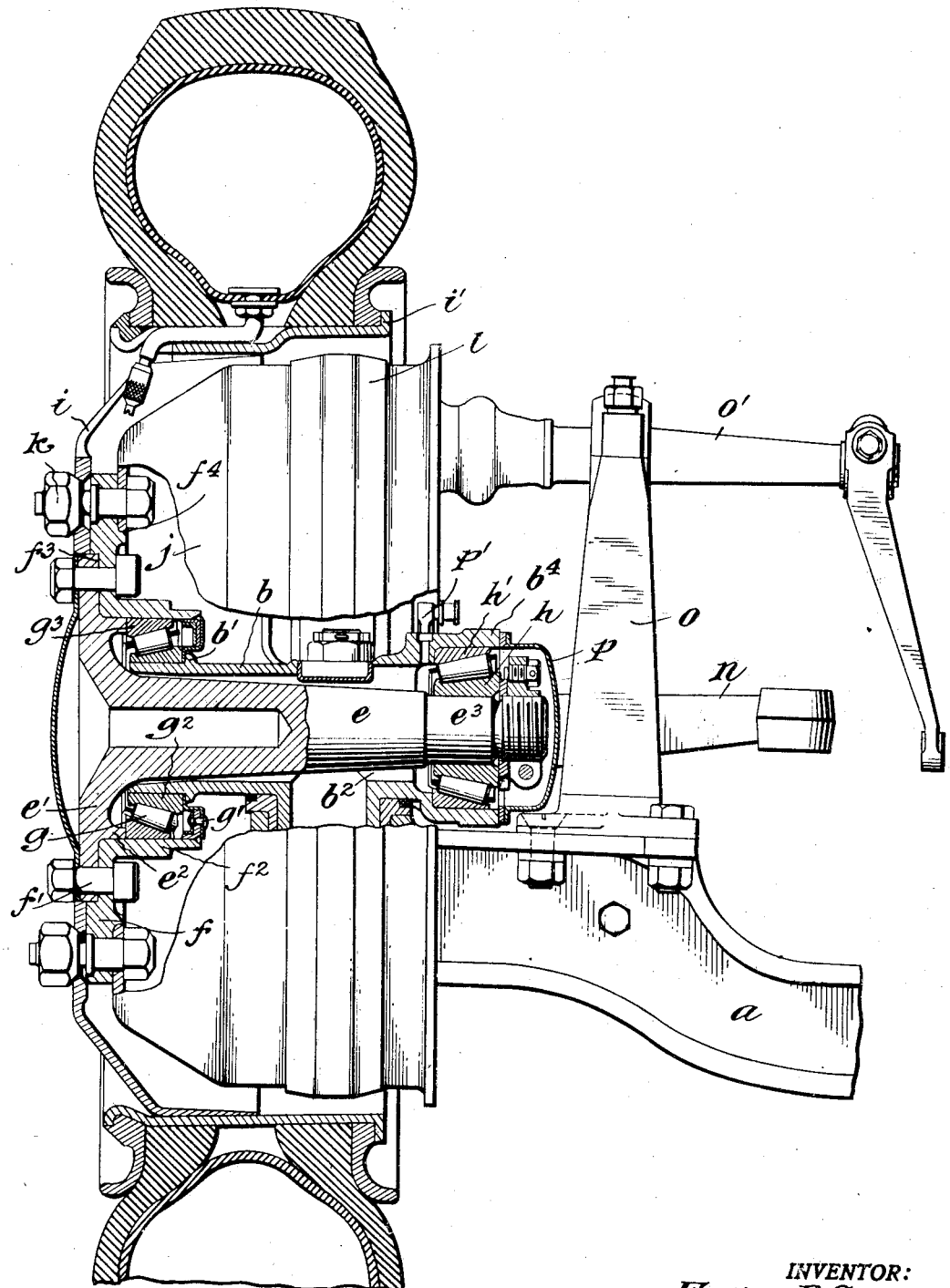

1,713,963

UNITED STATES PATENT OFFICE.

ERVING R. GURNEY, OF BEECHHURST, NEW YORK, N. Y., ASSIGNOR TO INTERNATIONAL MOTOR COMPANY, OF NEW YORK, N. Y., A CORPORATION OF DELAWARE.

FRONT-WHEEL CONSTRUCTION.

Original application filed August 7, 1926, Serial No. 127,838. Divided and this application filed February 15, 1927. Serial No. 168,261.

This invention relates to a wheel structure for motor vehicles and has especial reference to disc wheels having braking mechanism associated therewith and adapted to be used as the steering wheels of the vehicle.

The present case is a division of the application of the same inventor, Serial No. 127,838, filed August 7, 1926, for front wheel construction.

The object of the present invention is to provide a structure which shall be practical from the standpoint of manufacture and use, wherein the component elements have the requisite strength for the purpose at hand and are so disposed as to function efficiently when combined in compact relation within the limits of standardized motor vehicle wheels. Accordingly, the axle is supported by the wheel through the instrumentality of a unitary T-shaped knuckle and knuckle pin structure having a passage therethrough for the wheel spindle of a disc wheel. A brake drum is carried by the disc wheel and is disposed in a plane including the knuckle pin so that the brake actuating mechanism may be positioned in the axis of the knuckle pin in order to be operable when steering. Brake shoes are pivoted upon anchors depending upon either side of the steering knuckle from bosses formed thereon and a cam to expand the shoes displaces bearing members reciprocal in a bracket carried above the steering knuckle. The bearing races for the wheel spindle are disposed outwardly of the steering knuckle on the outer end thereof between the brake drum and the wheel disc, and are positioned at that end between a cylindrical flange on the wheel disc and a collar on the steering knuckle. On the inner end the bearing races are disposed within the steering knuckle.

In order that the invention may be clearly understood and readily carried into effect the same will now be described more fully in connection with the following detailed description of a preferred embodiment thereof which is illustrated in the accompanying drawings and in which:

The figure is a view partially in transverse vertical section showing the wheel structure and spindle mechanism according to the present invention.

The axle $a$ is suspended from a unitary T-shaped knuckle and knuckle pin structure $b$ through the instrumentality of suitable bearings in the usual manner. This knuckle structure $b$ is hollow and the steering knuckle portion is formed as a passage $b^2$ for the wheel spindle $e$. Outwardly, the wheel spindle is provided with a circular flange $e'$ which has an inwardly projecting shoulder $e^2$. An annular disc $f$ is bolted to the flange as at $f'$ and an inwardly extending cylindrical flange $f^2$ rests on the shoulder $e^2$ as shown in the drawings. This disc is provided with a centrally recessed seat as at $f^3$ to receive the flange of the spindle, and on its inner side is provided with a circumferentially disposed recess $f^4$ which receives the brake drum $j$.

Abutting the shoulder $e^2$ and carried within the flange $f^2$ is a bearing $g$ which may be provided with a suitable protective device $g'$. The knuckle pin is provided with a circumferential shoulder $b'$ and the bearing $g$ is confined between this shoulder and the flange $f^2$, the inner bearing race $g^2$ engaging the shoulder $b'$ and the outer race $g^3$ engaging the shoulder $e^2$ and carried by the flange $f^2$. The spindle tapers inwardly and its inner end $e^3$ is of reduced cylindrical form to receive the bearing race member $h$ co-operating with a bearing race $h'$ in the enlarged inner end $b^4$ of the steering knuckle, the internal diameter of which is increased at that point to receive the bearing race. This bearing is disposed substantially without the inner marginal surface of the wheel. The annulus $f$ also serves as a support for the wheel disc $i$ which may be of pressed metal and may have formed thereon a rim receiving portion $i'$ for a pneumatic tire. Inwardly the annulus $f$ has secured thereto a brake drum $j$ preferably by the same bolts K which secure the wheel disc thereto. The brake drum is reenforced against the expanding brake shoes by a ring $l$.

As is customary, the steering knuckle is provided with suitable means to constitute a steering connection while forwardly there is disposed an arm $n$ for the drag link connecting the steering knuckles of the two front wheels. These arms are carried by suitable bosses formed on the steering knuckle.

A bracket $o$ is secured to the axle $a$ and brake operating means $o'$ is carried thereby to effect the application of the brakes when desired.

A cap $p$ is applied to the end of the knuckle pin to prevent the lubricant from escaping and a suitable fixture p' is provided by means of which the bearing is lubricated.

It will thus be seen that a wheel structure has been provided wherein the necessary steering and braking devices are incorporated compactly and yet with ample space within which to function, the disposition of the bearings being upon the respective sides of the brake drum and steering devices which are operable in the same general plane in order to be efficacious when the plane of the wheel varies during steering.

The structure which embodies the annular disc and associated elements provides an efficient means for securing, simultaneously, the wheel disc and brake drum, as well as serving as the bearing support. It may be taken down and assembled quite readily and has been found to be a great improvement over existing designs.

Modifications in the configuration of the component elements will occur to those skilled in the art and are to be deemed within the scope of the invention as set forth in the appended claims.

What I claim is:

1. In a wheel structure mounted on a knuckle pin, a wheel, a brake drum, a spindle, a removable annulus carried by the spindle, an inner and outer bearing race between the annulus and the knuckle pin, means to secure the wheel and brake drum to the annulus, and means to secure the outer bearing race against the spindle and to the annulus.

2. In a wheel structure wherein a brake drum is carried thereby, a spindle, a removable annulus secured thereto and means to secure the wheel and brake drum to the annulus independently of the spindle.

3. In a wheel structure wherein a brake drum is carried thereby, a spindle, a circumferential flange formed thereon, a removable cylindrical annulus carried by the flange, and means to secure the wheel and brake drum to the annulus independently of the spindle.

4. In a wheel structure wherein a brake drum is carried thereby, a spindle, a circumferential flange formed thereon, a cylindrical annulus carried by the flange, a centrally recessed seat on the annulus to receive the flange, a circumferentially recessed seat on the annulus, means to secure the wheel in abutting relationship with the flange and to the outer side of the annulus, and means to secure the brake drum in the circumferential recess on the inner side of the annulus.

5. In a wheel structure, a steering knuckle having a passage therethrough, a wheel spindle formed with a flange, a wheel, a removable cylindrical annulus carried by the flange, means to mount the wheel on the annulus, a bearing race carried by the knuckle and a cooperating bearing race carried by the annulus.

6. In a wheel structure, in combination, a steering knuckle having a passage therethrough and formed with a circumferential shoulder, a wheel spindle in the passage formed with a flange, a cylindrical annulus carried by the flange, a cylindrical shoulder formed on the flange and seating the annulus, a bearing race engaging the shoulder on the knuckle, and a cooperating bearing race carried by the annulus and engaging the cylindrical shoulder thereon.

7. In a wheel structure, the combination with an axle, of an integral T-shaped steering knuckle and knuckle pin formed with a passage for a wheel spindle and a collar, a wheel spindle in the passage formed with a circumferential flange at its end, outwardly of the knuckle, a cylindrical annulus having a peripheral flange, means to secure the flange on the annulus to the spindle flange, a bearing race positioned by the collar on the knuckle, a complementary bearing race carried with the cylindrical annulus, a brake drum, in the plane of the knuckle pin, and means to secure the brake drum to the flange on the annulus.

This specification signed this 11th day of February A. D. 1927.

ERVING R. GURNEY.